United States Patent
Spry et al.

(10) Patent No.: US 8,615,615 B2
(45) Date of Patent: Dec. 24, 2013

(54) LOAD BALANCING WITH SCSI I/O REFERRALS

(75) Inventors: Andrew J. Spry, Wichita, KS (US);
Ross E. Zwisler, Lafayette, CO (US);
Gerald J. Fredin, Wichita, KS (US);
Kenneth J. Gibson, Lafayette, CO (US)

(73) Assignee: LSI Corporation, San Jose, CA (US)

( * ) Notice: Subject to any disclaimer, the term of this patent is extended or adjusted under 35 U.S.C. 154(b) by 251 days.

(21) Appl. No.: 12/496,378

(22) Filed: Jul. 1, 2009

(65) Prior Publication Data

US 2011/0004707 A1    Jan. 6, 2011

(51) Int. Cl.
*G06F 3/00*     (2006.01)
*G06F 9/46*     (2006.01)

(52) U.S. Cl.
USPC ............. 710/38; 710/9; 710/316; 718/103; 718/104; 718/105; 455/450; 455/453; 707/782

(58) Field of Classification Search
USPC ................................................ 710/38
See application file for complete search history.

(56) References Cited

U.S. PATENT DOCUMENTS

| | | | |
|---|---|---|---|
| 6,378,039 B1 * | 4/2002 | Obara et al. | 711/114 |
| 7,839,788 B2 * | 11/2010 | Qi | 370/235 |
| 2006/0056293 A1 * | 3/2006 | Kumagai et al. | 370/229 |
| 2007/0124407 A1 * | 5/2007 | Weber et al. | 709/212 |

* cited by examiner

*Primary Examiner* — Henry Tsai
*Assistant Examiner* — Dean Phan
(74) *Attorney, Agent, or Firm* — Suiter Swantz pc llo (57) ABSTRACT

A method and/or system may be configured to receive an input/output (I/O) request from an initiator system, add priority information to a multiple path referral for each port on which data can be accessed, selectively omit ports on which data may be accessed, transmit the multiple path referral from the target to the initiator, and/or choose a path on the initiator with the highest performance.

14 Claims, 6 Drawing Sheets

General Storage Cluster Architecture

| Offset | Length | Port Count | Port ID | Port Priority | Port ID | Port Priority | Port ID | Port Priority |
|---|---|---|---|---|---|---|---|---|
| LBA: 0 | 100 Blocks | 4 | 1 | 0 | 2 | 0 | 3 | 0 | 5 | 4 |
| LBA: 100 | 100 Blocks | 4 | 3 | 0 | 4 | 0 | 1 | 2 | 7 | 4 |
| LBA: 200 | 100 Blocks | 4 | 5 | 0 | 6 | 0 | 7 | 2 | 1 | 4 |

SCSI Referral for Virtual Volume 1 by Server 1

FIG. 5

| Offset | Length | Port Count | Port ID | Port Priority | Port ID | Port Priority | Port ID | Port Priority |
|---|---|---|---|---|---|---|---|---|
| LBA: 0 | 100 Blocks | 4 | 3 | 0 | 4 | 0 | 2 | 2 | 6 | 4 |
| LBA: 100 | 100 Blocks | 4 | 5 | 0 | 6 | 0 | 8 | 2 | 4 | 4 |
| LBA: 200 | 100 Blocks | 4 | 7 | 0 | 8 | 0 | 6 | 2 | 2 | 4 |

SCSI Referral for Virtual Volume 2 by Server 2

FIG. 7

| Offset | Length | Port Count | Port ID | Port Priority | Port ID | Port Priority | Port ID | Port Priority |
|---|---|---|---|---|---|---|---|---|
| LBA: 100 | 100 Blocks | 3 | 7 | 0 | 8 | 0 | 2 | 4 |

SCSI Referral for Load Balancing from Server 2 on Node 2, Controller 1

FIG. 8

LOAD BALANCING WITH SCSI I/O REFERRALS

CROSS REFERENCE TO RELATED APPLICATIONS

The following patent application is incorporated by reference herein in its entirety: U.S. patent application Ser. No. 12/316,713, filed Dec. 15, 2008, with Gerald J. Fredin, Andrew J. Spry, Kenneth J. Gibson, and Ross E. Zwisler listed as inventors.

TECHNICAL FIELD

The present invention relates to the field of networked storage accessed via a block storage protocol and particularly to a system and method for providing Small Computer System Interface (SCSI) referrals between an initiator system and a block storage cluster.

BACKGROUND

Small Computer System Interface (SCSI) Input/Output (I/O) referral techniques may be utilized to facilitate communication between an initiator system and a block storage cluster. For example, the initiator system (e.g., a data requester) may transmit a data request command to a first storage system of the block storage cluster. If the data requested is stored in the first storage system, the data may be retrieved and transferred to the initiator system. However, if a portion of the data requested is not stored by the first storage system, but is stored by a second storage system of the block storage cluster, a referral response may be transmitted from the first storage system to the initiator system. The referral response may provide an indication to the initiator system that not all of the requested data was transferred. The referral response may further provide information for directing the initiator system to the second storage system.

SUMMARY

A method for load balancing and communicating with a storage device may include receiving an input/output (I/O) request from an initiator system, adding priority information to a multiple path referral for each port on which data can be accessed, transmitting the multiple path referral, and/or choosing a path with the highest performance.

A storage system may include means for receiving an input/output (I/O) request from the initiator system, the first I/O request associating data for transfer to or transfer from a storage location; means for adding priority information to a multiple path referral for each port on which data can be accessed, where the priority information includes a relative performance for accessing data via at least one specific port; means for transmitting a multiple path referral including the priority information from the target to the initiator; means for receiving the referral at the initiator; and means for choosing a path with the highest performance on the initiator.

A system may include a computing device and instructions that when executed on the computing device cause the computing device to receive an input/output (I/O) request from the initiator system, the first I/O request associating data for transfer to or transfer from a storage location; add priority information to a multiple path referral for each port on which data can be accessed, where the priority information includes a relative performance for accessing data via at least one specific port; transmit a multiple path referral including the priority information from the target to the initiator; receive the referral at the initiator; and choose a path with the highest performance on the initiator.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the technology may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1 through 8, a method 800 for load balancing and communicating with a storage device is described. The method 800 may include operation 810 including receiving an input/output (I/O) request from an initiator system, operation 820 including adding priority information to a multiple path referral for each port on which data can be accessed, operation 830 including transmitting the multiple path referral, and/or operation 840 including choosing a path with the highest performance. Additionally, a network storage infrastructure system 100 for load balancing is described. The storage system may include means for receiving an input/output (I/O) request from an initiator system, means for adding priority information to a multiple path referral for each port on which data can be accessed, means for transmitting the multiple path referral, and means for choosing a path with the highest performance.

To implement load balancing, the virtualization layer 112 on the target may take advantage of the following characteristics of SCSI Referrals. A target may include an endpoint that does not initiate a SCSI session but waits for an initiator command and may provide a required input/output data transfer. Some examples of a target may include a data storage device, such as any storage system in a storage cluster 130, a hard disk, a server 102, and/or circuitry including non-volatile RAM. First, the data layout mapping in the initiator referral cache 128 may be incomplete. There is no requirement in SCSI Referrals to provide the initiator with referral information for all possible paths for a data segment in a virtual volume 118, 120, 122. An initiator may include an endpoint that initiates a SCSI session and/or sends a SCSI command. Some examples of an initiator may include a computer, a SCSI initiator, and/or a client. Second, the referral information may be incorrect due to a change in location of the data. On the next access to moved data, target simply sends back new referral information to the initiator so it can update its referral cache.

Figure 1:
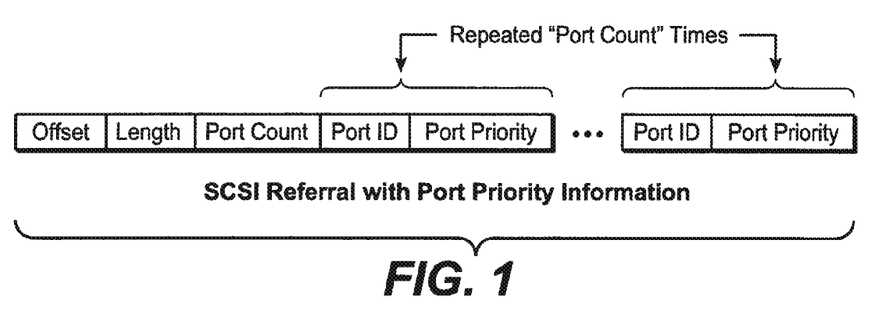
FIG. 1 illustrates an exemplary SCSI referral with port priority information.

The method 800 and network storage infrastructure system 100 extends the support for multiple paths and path optimization in SCSI referrals by adding priority information to a multiple path referral for each port 104 on which data may be accessed. This is provided by the port priority field for each port ID, which is illustrated in FIG. 1. The port priority value corresponding with each port 104 indicates the relative performance for accessing data via that port. The initiator should choose the path with the highest data access performance and balance loads only with other ports 104 having the same performance. If none of the high performance paths are available, the initiator may be free to use any of the paths with lower performance to access the data for fault tolerance. The port priority may only indicate relative performance between ports 104 listed in a multiple path referral, not necessarily the absolute performance of the port 104.

With the addition of port priority and the characteristics of the initiator referral cache 128, a target virtualization layer 112 is free to provide referrals for each initiator that controls how the initiator accesses its data on a storage cluster 130. If the target provides only one port 104 at each priority, it is directing the initiator to use a single port 104 to access the data in the absence of an access failure. The target may also selectively omit ports 104 on which data could be accessed to prohibit an initiator from accessing data via that port 104. Using these techniques, the target can influence or change the data access pattern of each initiator to distribute the load of multiple initiators more evenly across a storage cluster 130.

Figure 2:
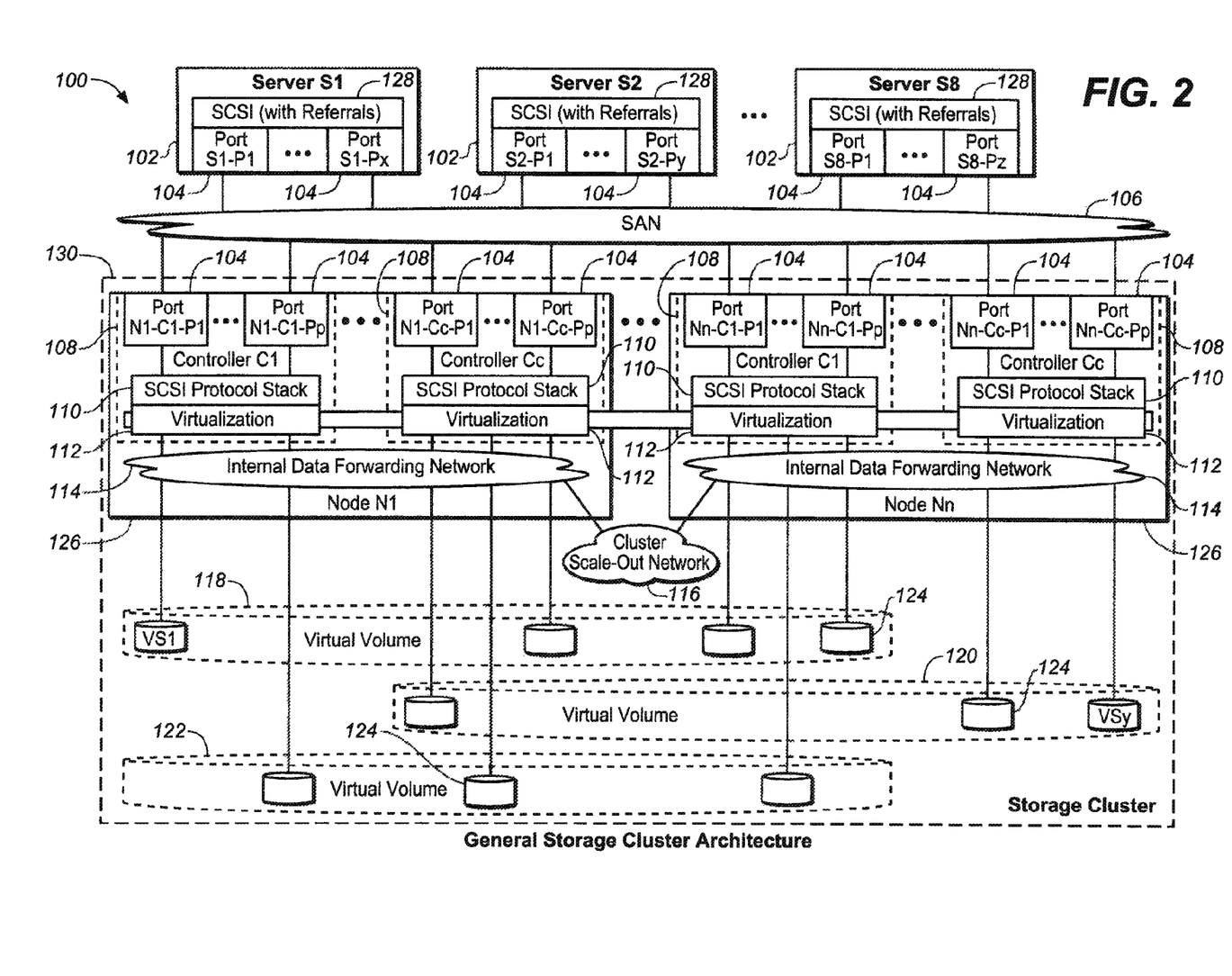
FIG. 2 illustrates an exemplary general storage cluster architecture.

In one embodiment, illustrated in FIG. 2, a storage cluster 130 may be composed of from 1 to n cluster nodes 126. Each cluster node 126 may be connected by a cluster scale-out network 116 that can be used by any controller 108 to access data on another cluster node 126 for a misdirected data request. Each cluster node 126 may contain from 1 to c controllers 108, which may implement the SCSI protocol stack 110 and the virtualization layer 112. Each controller 108 in a given cluster node 126 may also be connected by a higher speed internal data forwarding network 114. A volume segment ownership transfer model may also be used internally between each controller 108 in the same cluster node 126, further illustrated in FIG. 6. Each controller 108 may include from 1 to p ports 104 which connect to the storage area network (SAN) 106 used by each SCSI initiator to access the virtual volumes 118, 120, 122. Each controller 108 provides volume segments 124 which are used to build the virtual volumes 118, 120, 122.

In this general storage cluster architecture, any controller 108 can access any data on any volume segment 124 in the storage cluster 130. However, the efficiency of access to the data varies based on how the volume segment containing the data is accessed. Data in a volume segment owned by a controller 108 has the highest priority and most efficient access. Access to the same data from another controller 108 in the same cluster node 126 is lower priority and less efficient. Access to the data on another cluster node 126 over the cluster scale-out network 116 has the next lower priority and is even less efficient. Access to the data on another cluster node 126 via proxy I/O over a host network is the lowest priority and least efficient.

Figure 3:
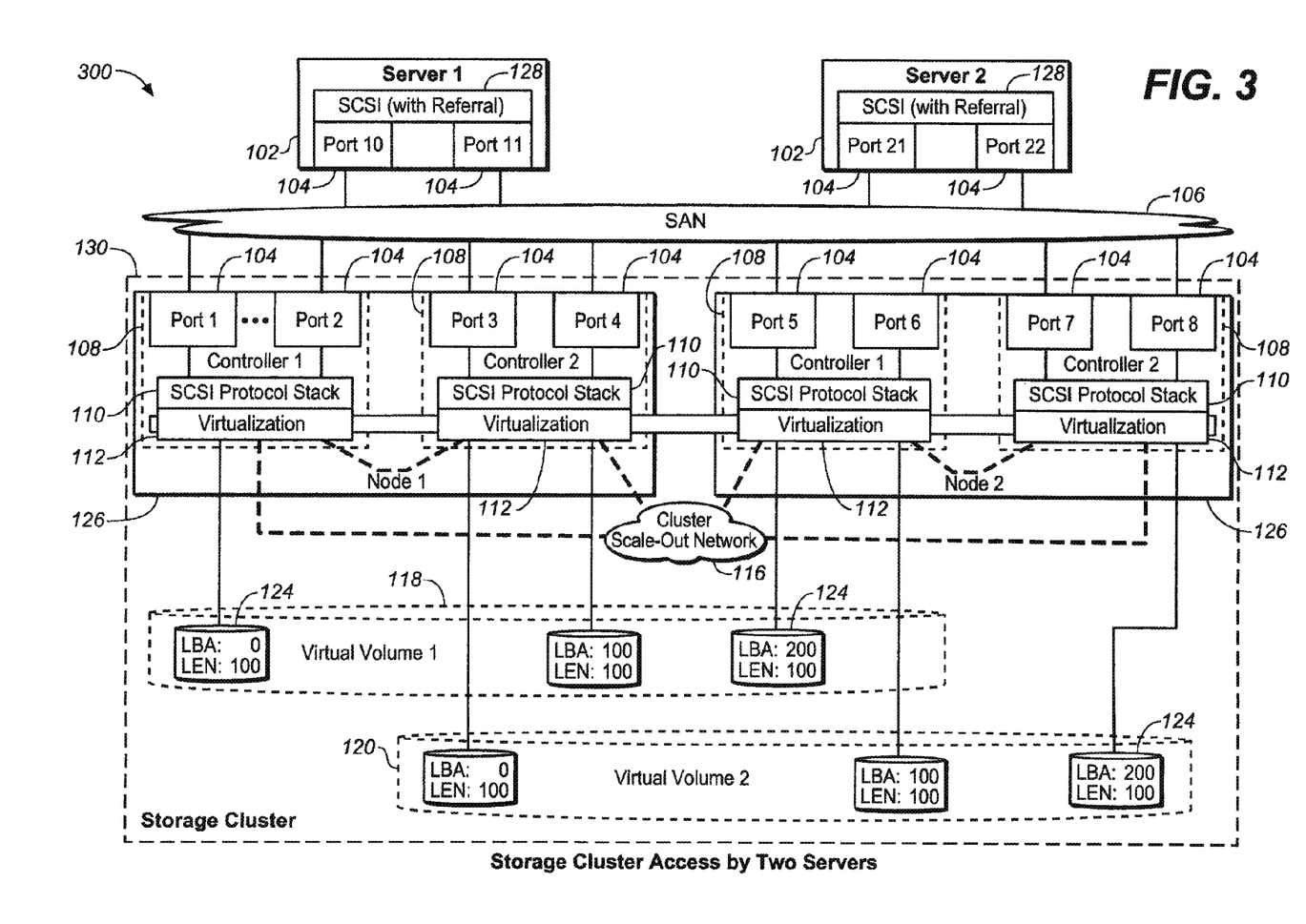
FIG. 3 illustrates an exemplary general storage cluster architecture.
Figure 4:
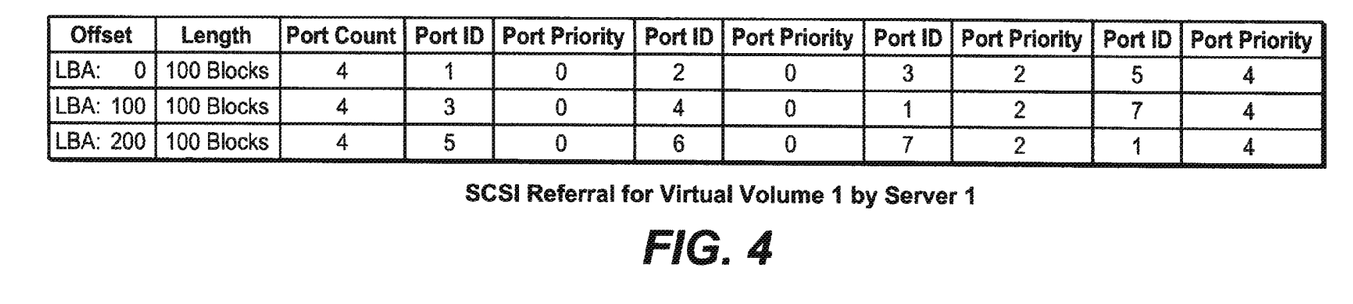
FIG. 4 illustrates an exemplary referral chart.
Figure 5:
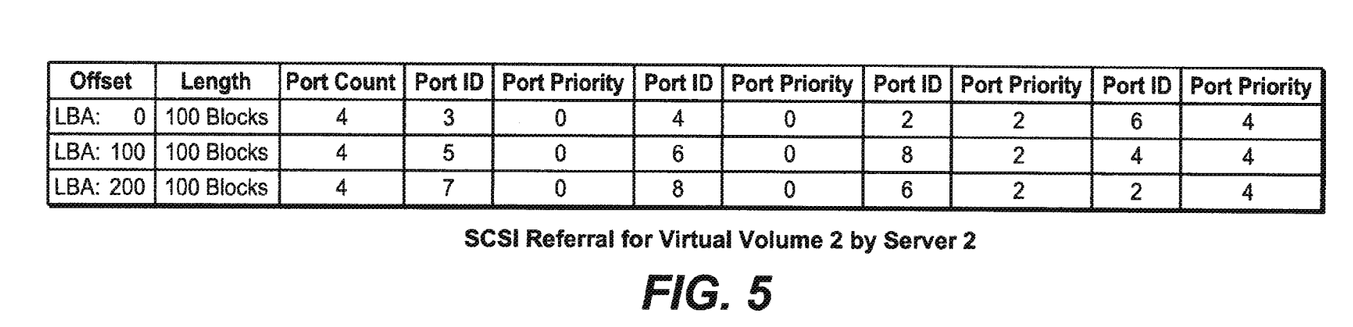
FIG. 5 illustrates an exemplary referral chart.

FIG. 3 illustrates an embodiment of two servers 102 accessing a storage cluster 130 with two cluster nodes 126. In this example, each cluster node 126 has two controllers 108. Each controller 108 also has two ports 104. Thus, the storage cluster 130 has 8 total ports 104 numbered from 1 to 8. In this embodiment, each volume segment 124 is owned by a single controller 108. There is an internal data forwarding connection between the controllers 108 in the cluster nodes 126. The storage cluster 130 also has a cluster scale-out network 116 connecting the two cluster nodes 126 so proxy I/O over the host network is not required. For example, access to data in a volume segment 124 owned by the controller 108 is given a priority of 0, access to data on an alternate controller 108 in a same cluster node 126 is given a priority of 2, and access to data on an alternate cluster node 126 over the cluster scale-out network 116 is given a priority of 4. In this embodiment, a lower priority value indicates more efficient access and better performance.

Each server 102 in this embodiment is accessing a virtual volume 118, 120 composed of 300 blocks. The data in each virtual volume 118, 120 is spread across controller 108 and cluster nodes 126 in the storage cluster 130. For example, the servers 102 may make their first accesses to each virtual volume 118, 120 after they have booted. Server 1 may receive the referral information show in FIG. 4. Server 2 may receive the information shown in FIG. 5. Additionally, the target may have not provided a full referral list. The target may have only returned relative performance information for 4 of the 8 ports on which each data range may be accessed. In the referral list(s), the target may have provided information for the highest performance ports as well as information for alternate, lower performance ports. The initiator may use this information to load balance activity across both ports on the controller 108 owning each volume segment 124 while using the additional port information if the controller 108 or cluster node 126 cannot be accessed.

Over time, more servers may start accessing additional virtual volumes 118, 120 on the storage cluster 130. As the load increases, a storage cluster monitoring layer may note that controller 1 on node 2 has become overloaded. A load analysis may show that server 2 is making significant amounts of accesses to logical block addresses (LBA) between 100 and 200 of virtual volume 2 that is accessed through the overloaded controller, and that controller 2 on node 2 is lightly loaded. The cluster monitor layer may decide to move at least part of the load to the lightly loaded controller.

Figure 6:
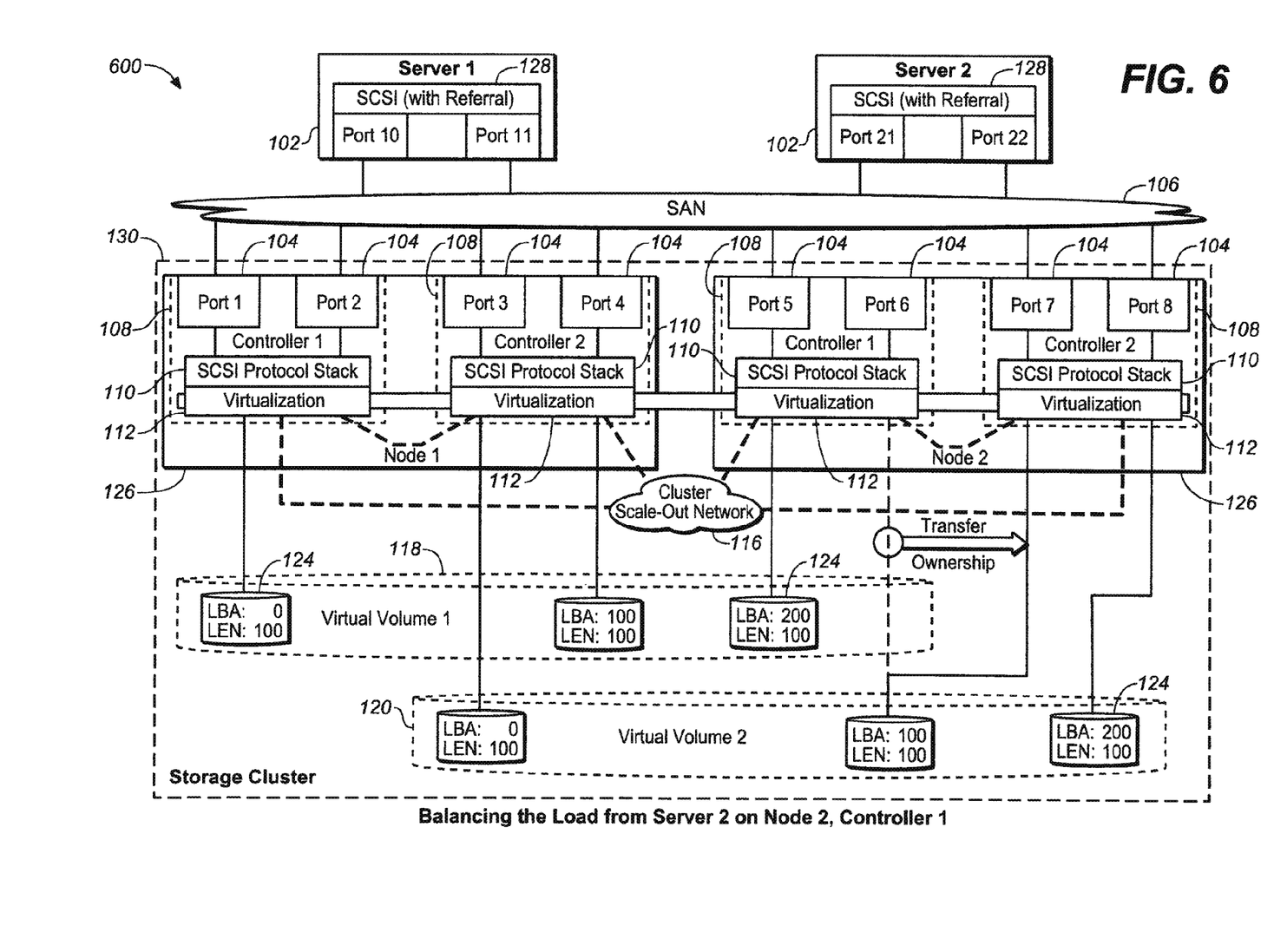
FIG. 6 illustrates an exemplary general storage cluster architecture.
Figure 7:
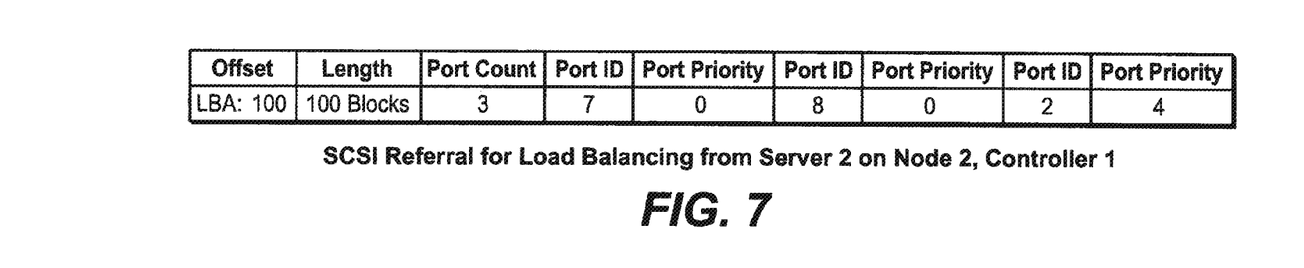
FIG. 7 illustrates an exemplary referral chart.

FIG. 6 shows how virtual volumes 118, 120 may be modified by the virtualization layer 112 to change the load pattern on the storage cluster 130. The virtualization manager may move ownership of the volume segment 124 from Controller 1 to Controller 2 so Server 2 may still have optimum performance access to the data in that volume segment 124. On the next access to data in that volume segment 124 received on either Port 5 or 6, the SCSI referral shown in FIG. 7 may be sent back to Server 2. In this SCSI referral, the server is informed that the best access to the data segment is now on Port 7 or Port 8. The only fault tolerant path provided in the referral is through Port 2 which resides on a different cluster node. This new referral information may evacuate the load generated by Server 2 from the overloaded controller.

The ability to move volume segments and provide alternate paths to volume segments depends greatly on the architecture of the storage cluster. The detailed architecture can impact which subset of information is provided back to the initiator in SCSI referrals. For example, in a storage cluster where Proxy I/O is used for access to data on a different storage cluster node, ports on a different cluster node may or may not be provided as part of the referral information. The referral information may instead provide more information on ports on other controllers in the same storage node. The same key features are employed but the details in the subset of possible paths in the referral vary depending on the capabilities of the storage cluster architecture.

Utilizing this method and network storage infrastructure for load balancing has many advantages. Because load analysis is done on the storage cluster 130, the load includes access information from all initiators using the storage cluster 130. The information allows decisions on load balancing and data access that are system wide in nature. Load balancing done on an initiator may only take into consideration the access patterns of that single initiator.

Load balancing with SCSI referrals is SCSI transport agnostic. Target side load balancing done with an iSCSI login redirection may only be done for the iSCSI SCSI transport protocol. Additionally, target side load balancing with SCSI referrals applies to the Fibre Channel and SAS SCSI transports.

Further, load balancing with SCSI referrals has higher resolution. Target side load balancing done with iSCSI login redirection treats an entire iSCSI target as a single entity. All logical units in the target must be moved as a group so the unit of load balancing is the aggregate load of all access to all LUNs on the target. With SCSI referrals, the load balancing unit is the volume segment. This is part of one LUN in a multiple LUN SCSI target. Thus, smaller units of load can be tracked and moved to provide more accurate load balancing in the storage cluster.

In an embodiment, an example computer program product is provided using a signal-bearing medium, and may include one or more instructions for receiving an input/output (I/O) request from the initiator system, the first I/O request associating data for transfer to or transfer from a storage location; one or more instructions for adding priority information to a multiple path referral for each port on which data can be accessed, where the priority information includes a relative performance for accessing data via at least one specific port; one or more instructions for transmitting a multiple path referral including the priority information; and one or more instructions for choosing a path with the highest performance. The one or more instructions may be, for example, computer executable and/or logic-implemented instructions. In one implementation, the signal-bearing medium may include a computer-readable medium, such as a non-volatile memory device and/or an optical disk. In one implementation, the signal bearing medium may include a recordable medium. In one implementation, the signal bearing medium may include a communications medium.

In one embodiment, a system includes a computing system environment. The computing device includes computer-executable instructions that when executed on the computing device cause the computing device to receive an input/output (I/O) request from the initiator system, the first I/O request associating data for transfer to or transfer from a storage location; add priority information to a multiple path referral for each port on which data can be accessed, where the priority information includes a relative performance for accessing data via at least one specific port; transmit a multiple path referral including the priority information; and choose a path with the highest performance.

The system includes at least one computing device. The computer-executable instructions may be executed on at least one computing device. For example, the computing device may implement the computer-executable instructions and output a result to (and/or receive data from) the computing device. Since the computer-executable instructions may be wholly or partially contained within the computing device, the device also may be said to execute some or all of the computer-executable instructions, in order to be caused to perform or implement, for example, various techniques described herein, or other techniques. The computing device may include, for example, a portable computing device, workstation, or desktop computing device.

Figure 8:
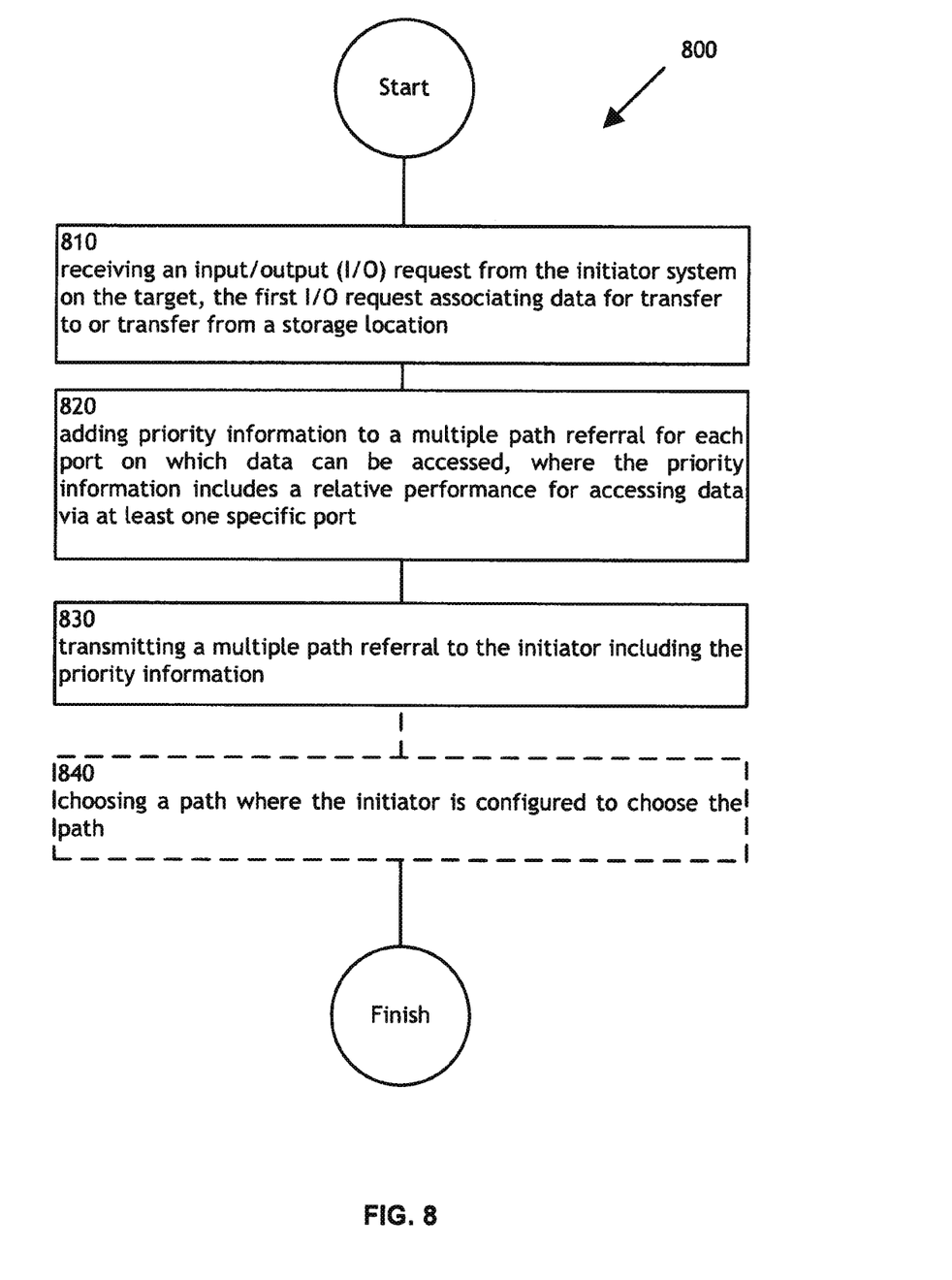
FIG. 8 illustrates a flow diagram depicting a method for balancing a load utilizing a SCSI referral.

FIG. 8 illustrates a method for communication between an initiator system and a block storage cluster including receiving an input/output (I/O) request from the initiator system on the target, the first I/O request associating data for transfer to or transfer from a storage location, adding priority information to a multiple path referral for each port on which data can be accessed, where the priority information includes a relative performance for accessing data via at least one specific port, transmitting a multiple path referral to the initiator including the priority information, and/or Error! Reference source not found.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method may be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for communication between an initiator system and a block storage cluster, comprising:

receiving an input/output (I/O) request from the initiator system on a target, the input/output (I/O) request associating data for transfer to or transfer from a storage location, the data configured to be accessed via a plurality of ports, each of the plurality of ports controlled by one of two or more controllers;

adding priority information to a multiple path referral for each port, by the target, on which the data configures to be accessed, where the priority information includes a plurality of relative performances for accessing data via the plurality of ports by the initiator system;

selectively omitting, by the target, one or more ports on which the data is configured to be accessed from the multiple path referral to prohibit an initiator from the initiator system from accessing data via those one or more ports, wherein the selectively omitting one or more ports temporarily shifts a load to at least one other port on which the data configures to be accessed;

transmitting multiple path referral to the initiator system including the priority information;

choosing a path from the multiple path referral by the initiator system;

determining, by the initiator system, that the chosen path includes an overloaded controller in the two or more controllers, the overloaded controller handling a disproportionate load as compared to other controllers in the two or more controllers; and moving, by the initiator system, a part of a load associated with the overloaded controller to another controller in the two or more controllers, outside the chosen path.

2. The method in claim 1, wherein adding priority information to a multiple path referral for each port, by the target, on which the data configured to be accessed, where the priority information includes a relative performance for accessing data via the plurality of ports, comprises:
adding priority information to a port priority field associated with each port.

3. The method in claim 1, wherein transmitting a multiple path referral to the initiator system including the priority information, comprises:
transmitting referral information including information regarding a port controlled by another controller.

4. The method in claim 1, wherein transmitting the multiple path referral to the initiator system including the priority information, comprises:
transmitting a dynamic update.

5. The method in claim 1, wherein transmitting the multiple path referral to the initiator system including the priority information, comprises:
transmitting an indication of at least one of data moved by the storage cluster and changed referral information.

6. The method in claim 5, wherein transmitting an indication of at least one of data moved by the storage cluster and changed referral information comprises:
updating an initiator referral cache.

7. The method in claim 1, wherein choosing a path from the multiple path referral by the initiator system, comprises:
choosing a path with lower performance to access data for fault tolerance when no higher performance path is available.

8. The method in claim 1, wherein choosing a path from the multiple path referral by the initiator system comprises:
receiving an input/output (I/O) request from the initiator system, the input/output (I/O) request associating data for at least one of transfer to and transfer from a volume segment;
adding priority information to a multiple path referral for each port on which data can be accessed, where the priority information includes a relative performance for accessing data via at least one specific port;
transmitting a multiple path referral from at least one target to an initiator system, where the multiple path referral includes the priority information; and
choosing a path on the initiator system with a highest performance indicated by priority information in a multiple path referral.

9. A target storage system, comprising:
means for receiving an input/output (I/O) request from an initiator system, the input/output (I/O) request associating data for transfer to or transfer from a storage location, the data configured to be accessed via a plurality of ports, each of the plurality of ports controlled by one of two or more controllers;
means for adding priority information, by the target, to a multiple path referral for each port on which the data configures to be accessed, where the priority information includes a plurality of relative performances for accessing data via the plurality of ports by the initiator system;
means for selectively omitting, by the target, one or more ports on which the data is configured to be accessed from the multiple path referral to prohibit an initiator from the initiator system from accessing data via those one or more ports, wherein the selectively omitting the one or more ports temporarily shifts a load to at least one other port on which the data configures to be accessed;
means for transmitting the multiple path referral from the target to the initiator system, where the multiple path referral includes the priority information;
means for choosing a path on the initiator system with a highest performance;
means for determining, by the initiator system, that the chosen path includes an overloaded controller in the two or more controllers, the overloaded controller handling a disproportionate load as compared to other controllers in the two or more controllers; and
means for moving, by the initiator system, a part of a load associated with the overloaded controller to another controller in the two or more controllers, outside the chosen path.

10. The storage system in claim 9, wherein means for receiving an input/output (I/O) request from the initiator system, the input/output (I/O) request associating data for transfer to or transfer from a storage location, comprises:
means for transmitting referral information including information regarding a port controlled by another controller.

11. The storage system in claim 9, wherein means for receiving an input/output (I/O) request from the initiator system, the input/output (I/O) request associating data for transfer to or transfer from a storage location, comprises:
means for transmitting an indication of at least one of data moved by the storage duster and changed referral information.

12. The storage system in claim 9, wherein means for receiving an input/output (I/O) request from the initiator system, the input/output (I/O) request associating data for transfer to or transfer from a storage location, comprises:
means for adding priority information to a port priority field associated with each port.

13. A system, comprising:
a computing device; and
a non-transistory computer readable medium storing instructions that when executed on the computing device cause the computing device to:
receive an input/output (I/O) request from an initiator system, the input/output (I/O) request associating data for transfer to or transfer from a storage location, the data configured to be accessed via a plurality of ports, each of the plurality of ports controlled by one of two or more controllers;
add priority information, by the target, to a multiple path referral for each port on which the data configures to be accessed, where the priority information includes a plurality of relative performances for accessing data via the plurality of ports by the initiator system;
selectively omit one or more ports, by the target, on which the data is configured to be accessed from the multiple path referral to prohibit an initiator from the initiator system from accessing the data via those one or more ports, wherein the selectively omitting the one or more ports temporarily shifts a load to at least one other port on which the data configured to be accessed;
transmit from the target to the initiator system the multiple path referral including the priority information;
choose a path on the initiator system with a highest performance;
determine, by the initiator system, that the chosen path includes an overloaded controller in the two or more controllers, the overloaded controller handling a disproportionate load as compared to other controllers in the two or more controllers; and move, by the initiator system, a part of a load associated with the overloaded controller to another controller in the two or more controllers, outside the chosen path.

14. The system in claim 13, wherein the computing device comprises at least one of a laptop computer, at least one processor, at least one server, a workstation computer, or a desktop computer.

\* \* \* \* \*